US011892786B2

(12) United States Patent
Ono

(10) Patent No.: US 11,892,786 B2
(45) Date of Patent: Feb. 6, 2024

(54) IMAGE HEATER

(71) Applicant: HEWLETT-PACKARD DEVELOPMENT COMPANY, L.P., Spring, TX (US)

(72) Inventor: Manabu Ono, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/910,050

(22) PCT Filed: Mar. 5, 2021

(86) PCT No.: PCT/US2021/021024
§ 371 (c)(1),
(2) Date: Sep. 8, 2022

(87) PCT Pub. No.: WO2021/183378
PCT Pub. Date: Sep. 16, 2021

(65) Prior Publication Data

US 2023/0229100 A1 Jul. 20, 2023

(30) Foreign Application Priority Data

Mar. 13, 2020 (JP) ................................ 2020-044569

(51) Int. Cl.
*G03G 15/20* (2006.01)
*G03G 15/00* (2006.01)

(52) U.S. Cl.
CPC ..... *G03G 15/2028* (2013.01); *G03G 15/6585* (2013.01)

(58) Field of Classification Search
None
See application file for complete search history.

(56) References Cited

U.S. PATENT DOCUMENTS 6,084,208 A * 7/2000 Okuda .............. G03G 15/2064 399/329
8,712,268 B2 * 4/2014 Iwasaki ............. G03G 15/2064 399/329

(Continued)

FOREIGN PATENT DOCUMENTS

EP 1091257 A1 * 4/2001 ........... G03G 9/0802
JP 09-160278 A 6/1997

(Continued)

*Primary Examiner* — Roy Y Yi
(74) *Attorney, Agent, or Firm* — Foley & Lardner LLP

(57) ABSTRACT

An image heating device includes a conveyance belt having a heat generation layer, and a first electrode portion, a second electrode portion and a third electrode portion that are in contact with the heat generation layer. The conveyance belt conveys a recording medium that includes an image. A first heat generation region formed on the conveyance belt between the first electrode portion and the second electrode portion generates heat to a first temperature that is equal to or greater than a deformation temperature at which a material forming the image is deformable. A second heat generation region formed between the second electrode portion and the third electrode portion generates heat to a second temperature that is different from the first temperature. The first heat generation region and the second heat generation region are located in a region of the conveyance belt to contact the recording medium.

15 Claims, 8 Drawing Sheets

(56) References Cited

U.S. PATENT DOCUMENTS

| | | | | |
|---|---|---|---|---|
| 2004/0058262 | A1 | 3/2004 | Serizawa et al. | |
| 2004/0081489 | A1* | 4/2004 | Noya | G03G 15/2021 399/328 |
| 2007/0120945 | A1 | 5/2007 | Akita et al. | |
| 2014/0278729 | A1 | 9/2014 | Liu et al. | |
| 2014/0290602 | A1 | 10/2014 | Kido et al. | |

FOREIGN PATENT DOCUMENTS

| | | | |
|---|---|---|---|
| JP | 2003-330299 | A | 11/2003 |
| JP | 2005-266300 | A | 9/2005 |
| JP | 2006-243444 | A | 9/2006 |
| JP | 2006-243465 | A | 9/2006 |
| JP | 2014-048904 | A | 3/2014 |
| JP | 2014-174987 | A | 9/2014 |
| JP | 2014-190258 | A | 10/2014 |
| JP | 2016-177206 | A | 10/2016 |
| JP | 2018-097305 | A | 6/2018 |

* cited by examiner

IMAGE HEATER

BACKGROUND

A number of approaches have been taken to adapt gloss application devices and belt-type fixing devices in printers, for increasing glossiness of image surfaces. In many approaches, a toner image on a recording material is first heated and melted in a state of surface contact with a belt, and the toner image is subsequently solidified by a cooling unit. The recording material is then peeled off and separated from the belt. The smoothness of the belt surface is transferred to the image surface on the recording material to form gloss on the image surface.

DETAILED DESCRIPTION

In the following description, with reference to the drawings, the same reference numbers are assigned to the same components or to similar components having the same function, and overlapping description is omitted.

An example image heating device will be described. The example image heating device may include a belt-shaped heating member including a heat generation layer that can generate heat by energization (e.g., electricity), and a first electrode portion, a second electrode portion, and a third electrode portion which extend in an axial direction of the belt-shaped heating member in a state of coming into contact with the belt-shaped heating member, and are sequentially disposed from an upstream side of a movement direction of the belt-shaped heating member. The example image heating device may form a “first heat generation region” partitioned by the first electrode portion and the second electrode portion, and a “second heat generation region” partitioned by the second electrode portion and the third electrode portion. The first heat generation region includes a common region with a contact width (e.g., a nip region where rollers contact the belt-shaped heating member). For example, the first heat generation region at least partially overlaps the contact width. The first heat generation region is set to a heat generation temperature that is equal to or greater than a temperature at which a material that constitutes an image is deformable. The second heat generation region does not include a common region with the contact width. For example, the second heat generation region has no overlap with the contact width. The second heat generation region is set to a heat generation temperature that is different from the heat generation temperature of the first heat generation region.

In some examples, the image heating device can be used as a fixing device that is mounted on an imaging apparatus that operates using an electrophotographic process.

Figure 1:
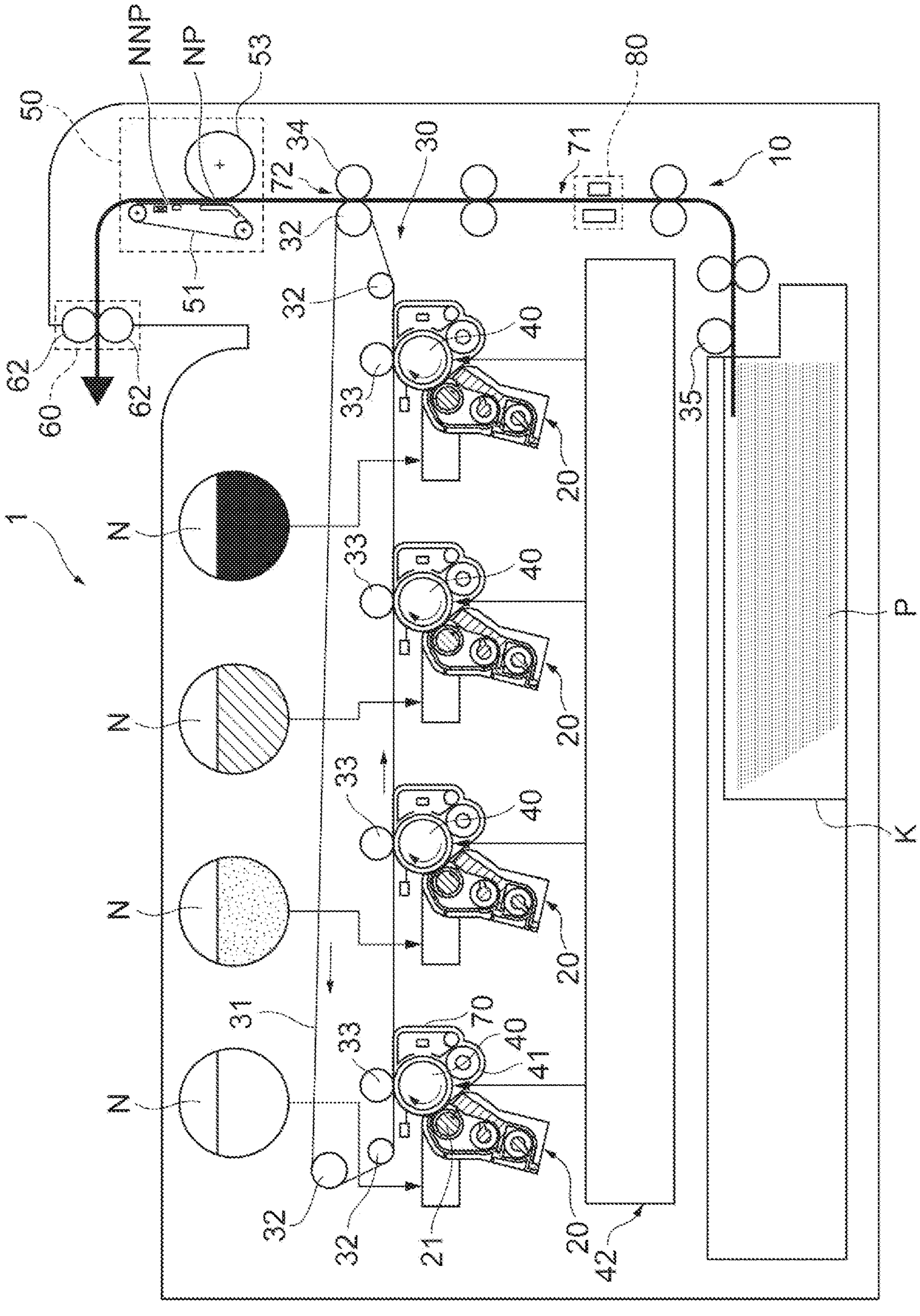
FIG. 1 is a schematic diagram illustrating an example imaging apparatus.

With reference to FIG. 1, according to an example, an imaging apparatus 1 may form a color image by using toners of the colors of magenta, yellow, cyan, and black. The example imaging apparatus 1 includes a conveyance device (e.g., a conveyance belt) 10 that conveys a recording medium P (recording material) such as a sheet of paper, an image carrier (e.g., photosensitive drum) 40 in which an electrostatic latent image is to be formed, a development device 20 that develops the electrostatic latent image to form a toner image, a transfer device 30 that is an imaging unit that transfers the toner image to the recording medium P, an image heating device 50 (hereinafter, also referred to as “fixing device 50” or “fixing device 50 with glossiness variable function”) that fixes the toner image to the recording medium P and can selectively adjust glossiness of an image obtained, and an ejection device 60 that ejects the recording medium P.

In some examples, the conveyance device 10 may be a conveyance belt that conveys the recording medium P such as paper on which an image is to be formed, along a conveyance route 71. The recording medium P is stacked and accommodated in a cassette K, and is picked up by a paper feeding roller 35. The conveyance device 10 causes the recording medium P to reach a secondary transfer region 72 through the conveyance route 71 at a timing when a toner image to be transferred to the recording medium P reaches the secondary transfer region 72.

In the present disclosure, the developing device 20 may refer to one or more developing devices 20, and the image carrier (e.g., photosensitive drum) 40 may refer to one or more image carriers 40. For example, the imaging apparatus 1 illustrated in FIG. 1 includes four development devices 20 that are associated with the four toner colors of magenta, yellow, cyan, and black, respectively, and additionally includes four image carriers 40 located adjacent the four developing devices 20, respectively. Each of the development devices 20 includes a development roller 21 that transfers a toner to be carried on the image carrier 40. The development device 20 adjusts amounts of the toner and a carrier to a targeted mixing ratio, and subsequently mixes and stirs the toner and the carrier to disperse the toner, so as to obtain a developer having an optimal or targeted charging amount. The developer is carried on the development roller 21, and is conveyed to a region that faces the image carrier 40 through rotation of the development roller 21. At this region, the toner that is included in the developer carried on the development roller 21 is transferred to an electrostatic latent image formed on a peripheral surface of an adjacent one of the image carriers 40, so as to develop the electrostatic latent image, and form a single-color toner image on the image carrier 40. Accordingly, the four image carriers 40 respectively form four single-color toner images with the four colors of toner.

In some examples, the four single-color toner images are primarily transferred to the transfer device 30 in a layered manner, to form a single composite toner image, and the transfer device 30 conveys the composite toner image to the secondary transfer region 72 where the composite toner image is secondarily transferred to the recording medium P. The transfer device 30 includes a transfer belt 31, a suspension roller 32, a primary transfer roller 33, and a secondary transfer roller 34. The suspension roller 32 supports (e.g., suspends) the transfer belt 31. The primary transfer roller 33 may refer to one or more primary transfer rollers 33. For example, four primary transfer rollers 33 may be provided in association with the four image carriers 40, respectively, so that each primary transfer roller 33 is located adjacent an associated one of the image carriers 40, such that the transfer belt 31 extends between the primary transfer roller 33 and the image carrier 40 to receive an associated one of the single color toner images. The secondary transfer roller 34 is located adjacent the suspension roller 32, such that the transfer belt 31 extends between the transfer roller 34 and the suspension roller 32, to secondarily transfer the composite toner image to the recording medium P.

According to examples, the transfer belt 31 is an endless belt that is circulated by the suspension roller 32. The primary transfer rollers 33 press against the image carrier 40 from an inner periphery side of the transfer belt 31. The secondary transfer roller 34 presses against the suspension roller 32 from an outer periphery side of the transfer belt 31.

According to examples, a plurality of the image carriers 40 are provided at respective positions which face the development devices 20 associated with the toner colors. The image carriers 40 are provided along a movement direction of the transfer belt 31. Each of the image carriers 40 may be a photosensitive drum for example. One of the development devices 20, a charging roller 41, and a cleaning unit (or cleaning device) 70 are provided adjacent (e.g., in a peripheral region of) a respective one of the image carriers 40. Accordingly, the example imaging apparatus 1 includes four charging rollers 41 and four cleaning units 70. An exposure unit (or exposure device) 42 is located adjacent the four image carriers 40. In the present disclosure, the charging roller 41 may refer to one or more charging rollers 41, and the cleaning unit 70 may refer to one or more cleaning units 70.

In some examples, the charging roller 41 charges a surface of the image carrier 40 to a predetermined potential. The charging roller 41 moves in accordance with a rotation of the image carrier 40. The exposure unit 42 exposes the surface of the image carrier 40 charged by the charging roller 41 in accordance with an image to be formed on the recording medium P. Accordingly, a potential of a portion of the surface of the image carrier 40 that has been exposed by the exposure unit 42 varies, so as to form an electrostatic latent image where the potential has changed. Each of the four development devices 20 develops one electrostatic latent image formed on the associated image carrier 40, by using the toner supplied from a toner tank N, thereby generating the single-color toner image. In the present disclosure, a toner tank N may refer to one or a plurality of toner tanks N. For example, the example imaging apparatus 1 includes four toner tanks N that are respectively filled with toners of magenta, yellow, cyan, and black. The cleaning unit 70 recovers a toner that remains on the image carrier 40 after the toner image formed on the image carrier 40 is primarily transferred to the transfer belt 31.

In some examples, the fixing device 50 carries out a fixing operation in which the composite toner image having been secondarily transferred from the transfer belt 31 to the recording medium P, is heated while being pressed against the recording medium P to fix the toner image, and subsequently carries out a gloss application operation in which the fixing device 50 with glossiness variable function continuously or repetitively performs glossiness adjustment of the fixed image. The fixing device 50 includes an endless belt 51 that is a belt-shaped heating member configured to heat the recording medium P, and a pressing roller 53 that is a rotary driving member that presses against the endless belt 51. The endless belt 51 is formed in a loop shape, and includes a base portion that can perform self-heat generation by power supply. For example, the base portion of the endless belt 51 generates heat in response to an electric power supply, so as to self-heat. The base portion forms an inner peripheral surface of the endless belt 51, and may also be referred to herein as a base material portion, or a base layer portion and may correspond to a heat generation layer, according to examples. A nip portion NP that is a contact region (also referred to herein as a contact width) is formed between the endless belt 51 and the pressing roller 53. The base portion of the endless belt 51 may generate heat at a timing when the recording medium P is passed through the nip portion NP, to fix the toner image to the recording medium P, and adjust a glossiness of the fixed image obtained.

In some examples, the ejection device 60 includes a pair of ejection rollers 62. The pair of ejection rollers 62 ejects the recording medium P to which the toner image is fixed, to the outside of the apparatus.

In an example printing process carried out by the example imaging apparatus 1, when an image signal of an image to be printed is input to the imaging apparatus 1, a control unit (e.g., a controller) of the imaging apparatus 1 causes the paper feeding roller 35 to rotate so as to pick up and convey the recording medium P stacked in the cassette K. In a charging operation addition, the control unit causes the charging rollers 41 to charge a surface of the respective image carriers 40 to a predetermined potential. In an exposure operation, the control unit causes the exposure unit 42 to irradiate the surface of each image carrier 40 with laser light based on the image signal received, to form a corresponding electrostatic latent image on each image carrier 40.

In a development operation, the development devices 20 develop the respective electrostatic latent images, to form the four single-color toner images. In a primary transfer operation, the single-color toner image formed in this manner on each of the image carriers 40, is primarily transferred from the image carrier 40 to the transfer belt 31 in a region in which the image carrier 40 faces the transfer belt 31. The single-color toner images of the respective colors formed on the four image carriers 40 are sequentially layered on the transfer belt 31, so as to form the composite toner image. In a secondary transfer operation, the composite toner image is secondarily transferred to the recording medium P conveyed from the conveyance device 10 in the secondary transfer region 72 where the suspension roller 32 faces the secondary transfer roller 34, to form a non-fixed toner image on the recording medium P.

Image Heating Device

The recording medium P including the non-fixed toner image is conveyed to the fixing device 50. In the fixing device 50, the recording medium P is conveyed while being in surface contact with the endless belt 51 that is rotating. The endless belt 51 includes a "first heat generation region" and a "second heat generation region". The first heat generation region includes the nip portion NP. In a fixing operation, the non-fixed toner image is fixed to a surface of the recording medium P while being pressed by the pressing roller 53. In a glossiness adjustment operation, additional heating is suitably applied in the second heat generation region and a cooling treatment is performed, in order to adjust the glossiness of the fixed image. Then, the recording medium P is ejected to the outside of the imaging apparatus 1 by the ejection rollers 62.

Figure 2B:
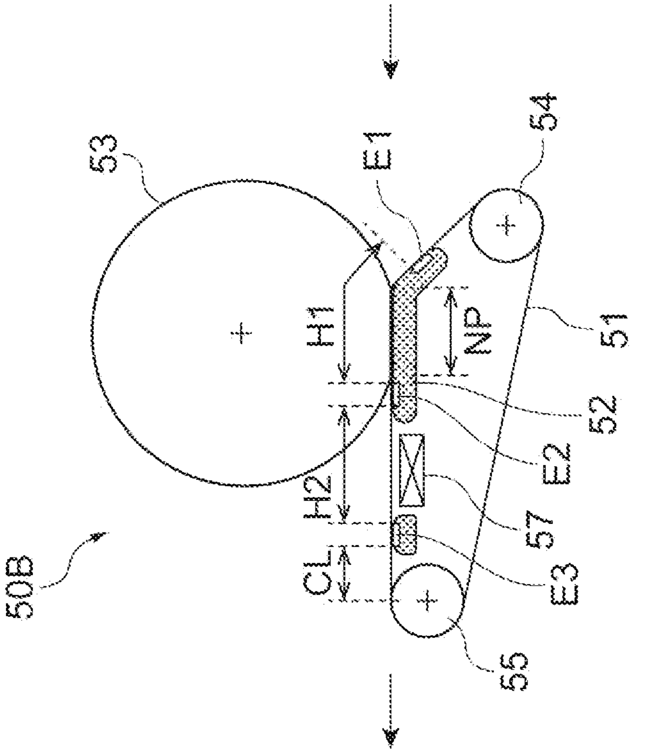
FIG. 2B is a schematic diagram of another example image heating device.
Figure 2A:
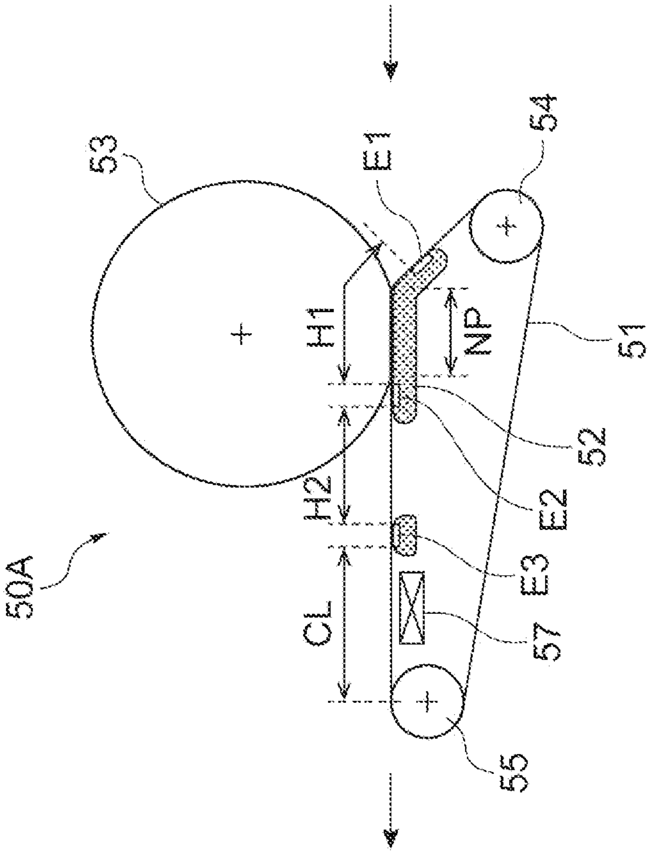
FIG. 2A is a schematic diagram of an example image heating device.

With reference to FIG. 2A, an example image heating device, namely an example fixing device 50A will be described. The example fixing device 50A with variable glossiness function includes the endless belt 51, a pressing member 52, the pressing roller 53, a first electrode portion E1, a second electrode portion E2, and a third electrode portion E3. The endless belt 51 extends in a rotational direction and in an axial direction that is orthogonal to the rotational direction. The first electrode portion E1, the second electrode portion E2, and the third electrode portion E3 extend in the axial direction of the endless belt 51 and are in contact with an inner peripheral surface of the endless belt 51. The first electrode portion E1, the second electrode portion E2, and the third electrode portion E3 are spaced apart sequentially from an upstream side of a movement direction of the endless belt 51 to form a "first heat generation region H1" (also referred herein to as "heat generation region H1") that is partitioned by the first electrode portion E1 and the second electrode portion E2, and to form a "second heat generation region H2 (also referred to herein as "heat generation region H2") that is partitioned by the second electrode portion E2 and the third electrode portion E3. In the heat generation region H1, the fixing operation is performed, to fix the non-fixed toner image onto the recording medium P to obtain the fixed toner image. In the case of applying gloss to the fixed toner image, heat is generated at the heat generation region H2 in order to achieve a gloss application operation.

The endless belt 51 is tensioned around the pressing member 52, a control member 54, and a peeling member 55. The pressing member 52 may be pressed toward the pressing roller 53, for example, by a pressing (or urging) mechanism. The pressing member 52 and the pressing roller 53 form the nip portion NP to position the endless belt 51 between the pressing member 52 and the pressing roller 53. The endless belt 51 is driven to rotate (move) in accordance with rotation of the pressing roller 53. The recording medium P with the toner image is introduced between the endless belt 51 and the pressing roller 53, and is conveyed therebetween. At this time, the toner image faces an outer peripheral surface of the endless belt 51.

The pressing member 52 includes the first electrode portion E1 and the second electrode portion E2. The first electrode portion E1 and the second electrode portion E2 extend in the axial direction of the endless belt 51, and are spaced apart in a rotation direction of the endless belt 51 to position the nip portion NP between the first electrode portion E1 and the second electrode portion E2. The first electrode portion E1 is located on an upstream side of the nip portion NP, and the second electrode portion E2 is located on a downstream side of the nip portion NP in a rotation direction of the endless belt 51. In addition, the third electrode portion E3 is disposed away from the nip portion, in a non-nip portion NNP, on a downstream side of the second electrode portion E2. The first electrode portion E1, the second electrode portion E2, and the third electrode portion E3 are in contact with a base portion of the endless belt 51 that forms an inner peripheral surface of the endless belt 51. Upon applying electric power that may be supplied from a power supply device, the heat generation region H1 is formed between the first electrode portion E1 and the second electrode portion E2 between which the nip portion NP is provided, and the heat generation region H2 is formed between the second electrode portion E2 and the third electrode portion E3 in the non-nip portion NNP.

Figure 3:
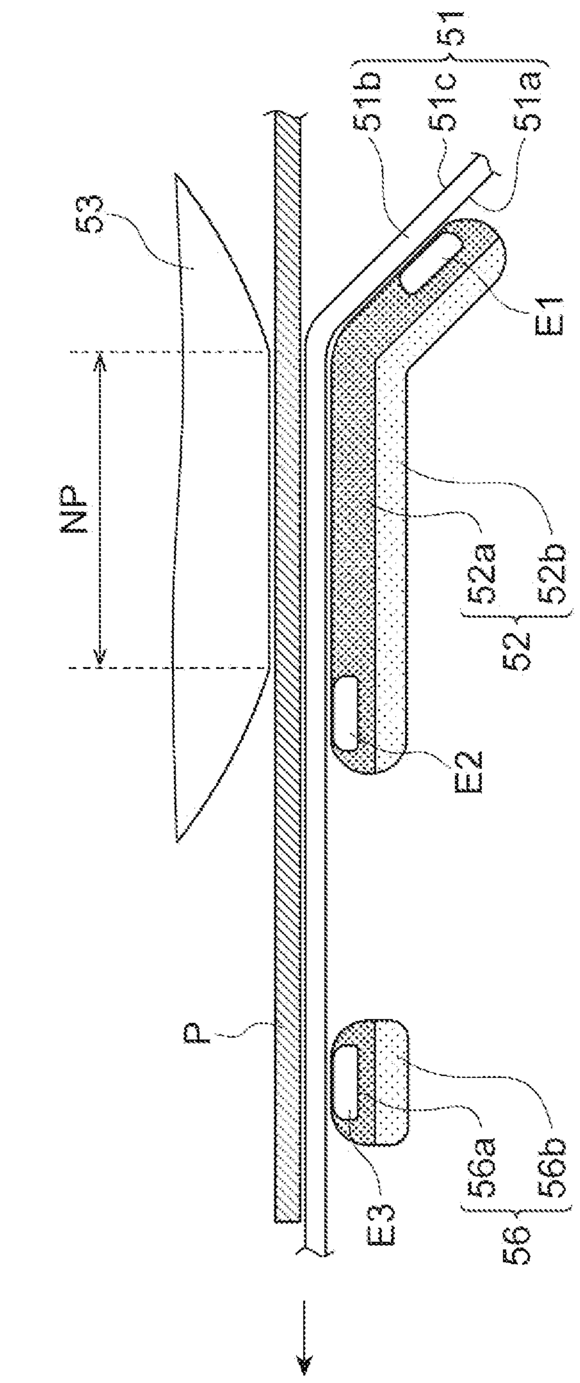
FIG. 3 is an enlarged schematic view of a portion of an example image heating device, illustrating a heat generation region.

With reference to FIG. 3, the pressing member 52 includes an electrode unit (or electrode layer) 52*a* and a frame 52*b*. The electrode unit 52*a* may be formed integrally with the frame 52*b*. A pressure (or force) is applied to the pressing member 52 by a pressing mechanism. The frame 52*b* extends longitudinally in the axial direction of the endless belt 51. Longitudinal ends of the frame 52*b* protrude from respective openings at opposite edges (e.g., at axial end portions) of the endless belt 51. The pressure is applied to the protruding end portions of the frame 52*b*, so as to press the frame 52*b* against the endless belt 51 toward the pressing roller 53 in a direction intersecting the axial direction of the endless belt 51. The frame 52*b* has sufficient rigidity to resist bending from the force applied at the longitudinal ends and a reaction force received from the pressing roller 53.

The electrode unit 52*a* is interposed between the frame 52*b* and the endless belt 51. The first electrode portion E1 and the second electrode portion E2 are provided at a surface of the electrode unit 52*a* which faces the inner peripheral surface of the endless belt 51.

The first electrode portion E1 and the second electrode portion E2 each has a plate shape extending in the axial direction of the endless belt 51. The first electrode portion E1 is spaced apart from the second electrode portion E2 in a direction intersecting the axial direction (e.g., in a direction of the rotation of the endless belt 51). A power supply device is connected to the first electrode portion E1 and the second electrode portion E2 to supply electric power between the first electrode portion E1 and the second electrode portion E2, so that an inner peripheral surface of the endless belt 51, in the heat generation region H1 located between a downstream side edge of the first electrode portion E1 and an upstream side edge of the second electrode portion E2, generates heat due to the electric power supplied. A short-circuit prevention insulating portion is provided between the first electrode portion E1 and the second electrode portion E2.

A high-resistance or insulating material is used in the electrode unit 52*a*, and a material having low thermal conductivity or a material having low surface friction (e.g., high surface slipperiness) may also be used. Examples of the material include polytetrafluoroethylene (PTFE), perfluoroalkoxy fluororesin (PFA), and ethylene tetrafluoride/propylene hexafluoride copolymer (FEP). The pressing member 52 is shaped to fix the first electrode portion E1 and the second electrode portion E2.

An electrode support member 56 extends in the axial direction of the endless belt 51, and positions the third electrode portion E3 into contact with the inner peripheral surface of the endless belt 51 in a region other than the nip portion NP on a downstream side of the second electrode portion E2. The power supply device is connected to the second electrode portion E2 and the third electrode portion E3, to supply electric power between the second electrode portion E2 and the third electrode portion E3 so that the inner peripheral surface of the endless belt 51 at the heat generation region H2 located between a downstream side edge of the second electrode portion E2 and an upstream edge of the third electrode portion E3, generates heat due to the electric power supplied.

The third electrode portion E3 can be divided along the axial direction into separate electrodes (or divided electrodes), in order to vary glossiness within a same page, for example to print an image showing glossiness in a selected region that is different from that adjacent the selected region within the same page. In this case, a different voltage may be applied for a given duration to a group among the separate electrodes (or a divided electrode group) corresponding to a position(s) along an axial direction of the endless belt, within an image of which glossiness is set to be different. For example, to increase the glossiness in comparison to other adjacent images, a relatively high voltage is applied (e.g., the voltage is increased). In some examples, a gradual glossiness variation may be achieved by continuously (or gradually) varying the application voltage, to obtain an image having a gradual variation of gloss.

The electrode support member 56 includes an electrode unit (or electrode layer) 56*a* and a frame 56*b*. The electrode unit 56*a* can be formed integrally with the frame 56*b*. In some examples, the electrode support member 56 may be formed integrally with the pressing member 52. In this case, the heat generation region H2 is positioned away from the nip portion so as to be offset from (no overlap with) the nip portion NP in the movement direction of the endless belt 51.

The base portion of the endless belt 51 contains a base material, such as a nanocomposite material in which carbon nanofillers are dispersed. The endless belt 51 serves as a heating body that generates heat by energization in the heat generation region H1 and the heat generation region H2, and serves as a heat dissipation body for removing (e.g., absorbing) heat in a cooling region CL. The nanocomposite material that may be used in the base portion (base material portion) of the endless belt 51 is a composite material that is composited in a nanoscale, and is obtained by dispersing carbon fillers in a matrix resin.

Composite materials have an inner structure, which when subjected to repetitive deformation due to an external force, a shear stress or a deviation stress occurs in the internal structure, and a decrease in strength tends to occur. This tendency is promoted by repetition of energization and heat shock.

A volume resistivity A in a rotation direction (also referred to herein as "rotation-direction volume resistivity A") of the endless belt 51 may be set to be less than volume resistivity B in the axial direction (also referred to herein as "axial-direction volume resistivity B") of the endless belt 51. In this case, an effect of an inner stress that occurs in the rotation of the endless belt is reduced, so as to maintain a conductive path between the electrodes E1, E2 and E3. A ratio of the rotation-direction volume resistivity A to the axial-direction volume resistivity B (also referred to herein as "volume resistivity ratio NB") may be 0.50 to 0.95, according to some examples in order to significantly reduce an increase in an application voltage in continuous use of the endless belt. In some examples, the volume resistivity ratio NB may be 0.60 to 0.85, in order to stabilize travelling of the endless belt under a heat generation state, and reduce image gloss unevenness in a fixed toner image.

Examples of the carbon fillers which are used in the base portion of the endless belt 51 include carbon fibers, carbon nanotubes (CNTs, or also referred to herein as "CNT"), and whiskers of a carbon-based material, which may be used alone or in combination (e.g., in a state of being mixed). Among these, the CNT is used in an example. In some examples, a diameter (or particle diameter) of the CNT is 2 nm to 20 nm, and a ratio of a length to the diameter (also referred to herein as "aspect ratio") of the particles of the CNT may be 100 to 15000. In a case where the diameter exceeds 20 nm, or the aspect ratio is less than 100, the conductive path may be more difficult to form, and in a case where the aspect ratio exceeds 15000, dispersion of the CNT in the matrix material decreases.

The amount of the carbon fillers contained may be 3% by mass to 25% by mass, or 5% by mass to 20% by mass. When the amount of the carbon fillers contained is too low, the heat generation characteristics may be insufficient in some cases. In addition, an amount of the carbon fillers contained that is too great may stiffen the base portion of the endless belt 51, and impact the mechanical strength, such that an adjustment of the volume resistivity A/B becomes difficult.

Examples of the matrix material that is used in the base portion of the endless belt 51 include a polyimide resin, and a polyamide-imide resin, which may be used alone or in combination (e.g., in a state of being mixed), in order to achieve targeted heat generation characteristics, in addition to mechanical characteristics, thermal stability, chemical stability, and the like.

The base portion of the endless belt 51 is manufactured so that the rotation-direction volume resistivity A is less than the axial-direction volume resistivity B. The base portion of the endless belt 51 can be manufactured by using various manufacturing methods. According to some example methods, a coating liquid, is obtained by dissolving the matrix material or a raw material of the matrix material in a solvent or by heating and melting the matrix material or the raw material, and by dispersing the carbon fillers in the resultant matrix material, and the coating liquid is coated on a mold. The coating liquid is dried, and heated and baked to process and mold the base portion. In some examples, a coating liquid in which carbon fillers having a specific shape are dispersed on a surface of the mold while ejecting the coating liquid from a dispenser including an ejection port having a relatively small diameter, in order to adjust an alignment state of the carbon fillers in the endless belt, so as to impart targeted electrical characteristics to the endless belt, such as resistivity and the like.

The endless belt 51 may have a layered structure including a heat generation layer 51*a*, an intermediate layer 51*b* and a surface layer 51*c*. The heat generation layer 51*a* may be made of the nanocomposite material forming a base of the layered structure. The intermediate layer 51*b* and the surface layer 51*c* are layered onto the heat generation layer 51*a* directly or with an adhesive layer. In some examples, the intermediate layer 51*b* may be omitted, and the surface layer 51*c* may be layered onto the heat generation layer 51*a* directly or with an adhesive layer.

In some examples, the intermediate layer 51*b* may be formed of a material such as a silicone rubber having greater heat resistance and elasticity, so as to impart elasticity to the endless belt 51. In some examples, the intermediate layer 51*b* is manufactured by curing the silicone rubber applied onto the heat generation layer 51*a*, so as to mitigate the effects of external forces that may impact the base portion of the endless belt 51 with an elasticity of the intermediate layer 51*b*. Consequently, an influence of the inner stress that occurs during a rotation of the endless belt 51 is reduced, so as to maintain a conductive path in the endless belt. The thickness of the intermediate layer 51*b* may be 0.3 mm to 3 mm according to some examples. In some examples, the thickness of the intermediate layer 51*b* is 0.3 mm or more, to impart sufficient elasticity to the endless belt. In some examples, the thickness of the intermediate layer 51*b* may be 3 mm or less, in order to achieve sufficient flexibility of the base portion of the endless belt.

The surface layer 51*c* may be provided on the outer periphery surface of the endless belt 51. The surface layer 51*c* of the endless belt 51 may include a material such as a fluorine-based resin having targeted heat resistance and releasability. Examples of such a material include polytetrafluoroethylene (PTFE), perfluoroalkoxy fluororesin (PFA), and ethylene tetrafluoride/propylene hexafluoride copolymer (FEP). In addition, properties such as flame retardancy and an antistatic property can be imparted to the fluorine-based resins or the like by dispersing an additive into the fluorine-based resins or the like. In some examples, the surface layer 51$c$ is formed by a method of sintering the applied fluorine resin, a method of coating a fluorine resin tube, or the like. According to examples, the thickness of the surface layer 51$c$ may be up to half the thickness of the base portion which corresponds to the heat generation layer 51$a$ in this example of the endless belt 51, and volume resistivity of the surface layer 51$c$ may be 10 or more times the rotation-direction volume resistivity A of the base portion. The thickness of the surface layer 51$c$ may be is up to haft the thickness of the base portion of the endless belt 51, in order to achieve a targeted flexibility of the base portion of the endless belt 51. The volume resistivity of the surface layer 51$c$ may be less than 10 times the volume resistivity A of rotation resistivity of the base portion, in order to prevent a formation of a new energization route (or conductivity route) inside the endless belt, which may decrease the energization efficiency for the heat generation layer 51$a$.

The pressing roller 53 is rotated by a motor of which rotation is controlled by a rotation control unit (or motor controller). While the endless belt 51 is rotated according to the rotation of the pressing roller 53, energization control (e.g., power supply control) for the first electrode portion E1, the second electrode portion E2, and the third electrode portion E3 is carried out in order to control a heat generation state of the endless belt 51 in the heat generation region H1 and the heat generation region H2.

The example pressing roller 53 includes a core made of a metallic material such as an aluminum material and/or a Steel Use Stainless (SUS) material, an elastic layer on the core, made of a heat-resistant silicone rubber exhibiting elasticity, and may further include a releasing layer exhibiting releasability that forms an outermost surface of the pressing roller 53.

The example control member 54 may have a roller shape or a substantially cylindrical shape, and may be configured to shift the endless belt 51 along the axis of the control member 54. Accordingly, the endless belt 51 is adjusted and rotated to pass through a predetermined position in a direction orthogonal to the axial direction of the endless belt 51. The example control member 54 illustrated in FIG. 2A is a roller-shaped member. The control member 54 includes a shaft having a first end that is fixed, and a second end that is supported by a displacement mechanism to incline the shaft with respect to the axial direction of the endless belt 51, so as to reciprocate the endless belt 51 with respect to the axial direction. In order to operate the control member 54 and the displacement mechanism, a position of an edge of the endless belt 51 is detected by a position detection sensor or the like, and the endless belt 51 is displaced by the control member 54 and the displacement mechanism based on the detection information. The displacement mechanism may be operated by a driving means such as a motor for example, according to a control method for displacing the endless belt.

The peeling member 55 is configured to peel off the recording medium P that is in surface contact with the outer peripheral surface of the endless belt 51 by using the rigidity of the recording medium P. The peeling member 55 may be obtained by processing a metallic material into a roller shape or a cylindrical shape. The peeling member 55 may include a cylindrical member having greater heat conductivity, in order to achieve a gradual cooling of the endless belt 51, to increase productivity (e.g., printing efficiency), and to widen an adjustment range of glossiness applicable to a fixed image on the recording medium P.

In FIG. 2A, the example peeling member 55 of the fixing device 50A may include a roller-shaped member made of SUS. In a modified example, with reference to FIG. 2B, a peeling member 55 of a fixing device 50B may include a cylindrical member made of aluminum, and an inner peripheral surface of the cylindrical member can be cooled by a blowing unit (or blowing device).

The endless belt 51 is tensioned and wound (or looped) around the peeling member 55 such that a base layer portion of the endless belt is in surface contact with an outer peripheral surface of the peeling member 55. The base layer portion of the endless belt 51 is constituted by a nanocomposite material in which carbon fillers are dispersed, so as to impart suitable heat generation characteristics and heat conductivity to the endless belt 51, so that the peeling member 55 removes heat from the endless belt 51 with greater efficiency. An external size of the peeling member 55 may be set depending on adhesive strength between the endless belt 51 and a fixed image on the recording medium P, and a winding angle of the endless belt 51 around the peeling member 55.

A toner image transferred to the recording medium P is fixed to the recording medium P by heat generation of the endless belt 51 and pressure from the pressing roller 53 when the recording medium P is positioned between the pressing roller 53 and the endless belt and transferred to the heat generation region H1, so as to form a fixed image. The fixed image comes into surface contact with the outer peripheral surface of the endless belt 51. The recording medium P transferred to the heat generation region H2 in a state in which the fixed image is in surface contact with the outer peripheral surface of the endless belt 51 can be heated further, in order to increase an adhesion property between the fixed image and the endless belt 51. The smoothness on the outer peripheral surface of the endless belt 51 is transferred to the fixed image on the recording medium P when the fixed image is in surface contact with the endless belt 51, so as to form glossiness to a surface of the fixed image.

Figure 4:
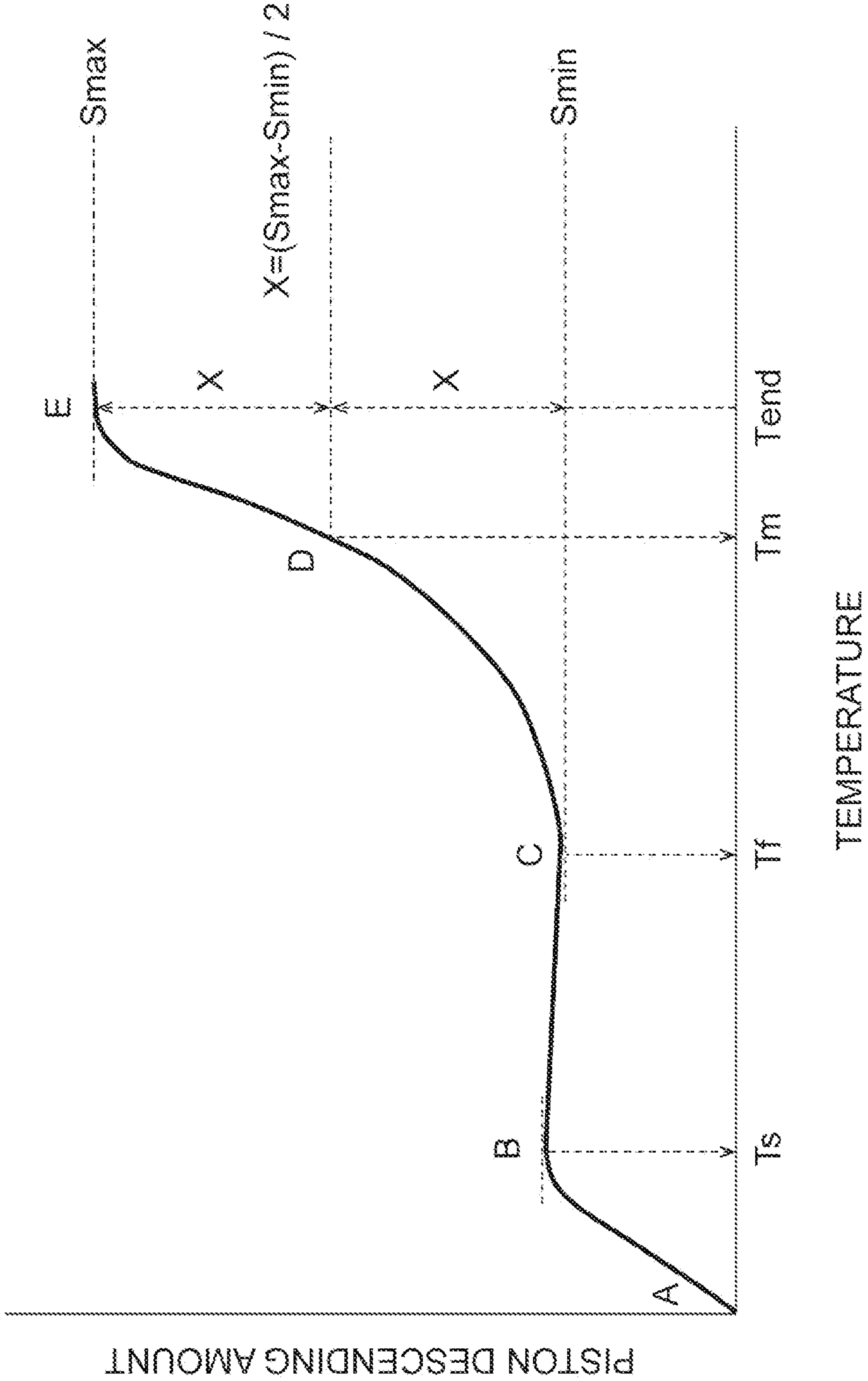
FIG. 4 is a graph illustrating a toner flow curve obtained by a temperature rise method.

With reference to FIG. 4, a softening temperature or a melting temperature of a material that constitutes an image can be measured. In the case of a toner that constitutes a toner image, the temperatures are determined by using a toner flow curve by a temperature rise method which is measured by a constant test force extrusion-type capillary rheometer "flow tester CFT-500 type" (manufactured by SHIMADZU CORPORATION). In a test method, 1.0 g of toner sample molded under a pressure is put into a heating cylinder including a nozzle having a diameter of 1 mm (length: 1 mm), a piston is placed thereon, and a test load of 98 N (10 kgf) is applied. The toner sample is extruded from the nozzle while heating the toner sample at a temperature rising rate of 3.0° C./minute, and a piston descending amount that is a function of the amount of melted outflow toner is recorded to obtain the toner flow curve by the temperature rise method. As illustrated in FIG. 4, a temperature at an inflection point B represents a softening temperature Ts of the toner, and a temperature of an inflection point C at which the piston starts to descend again after a slight ascent of the piston due to thermal expansion of the toner sample, represents a flow initiation temperature Tf of the toner, at which the toner transitions from a soft material to a fluid material. A temperature at an intermediate point D between the inflection point C and an outflow termination point E of the toner sample represents a melting temperature Tm of the toner, and a piston descending amount at the intermediate point D corresponds to a value obtained by adding a value X that is the half of a difference between a piston descending amount Smax at the outflow termination point E and a piston descending amount Smin at the flow initiation temperature Tf to the Sm in.

In an example image heating device, a temperature of the outer peripheral surface of the belt-shaped heating member in the heat generation region H1 may be set to be equal to or greater than a temperature at which a material that constitutes an image on a recording medium is deformable. In addition, a temperature of the outer peripheral surface of the belt-shaped heating member in the heat generation region H2 is set to be greater than the temperature of the outer peripheral surface of the belt-shaped heating member in the heat generation region H1.

For example, in the fixing device 50 of the imaging apparatus 1, a temperature T1 of the outer peripheral surface in the heat generation region H1 (hereinafter referred to as "setting temperature T1 of the heat generation region H1") is set to be equal to or greater than the softening temperature Ts of the toner that constitutes the toner image on the recording medium P (hereinafter referred to as "toner softening temperature Ts"). A temperature T2 of the outer peripheral surface of the endless belt 51 in the second heat generation region H2 (hereinafter referred to as "setting temperature T2 of the heat generation region H2") is set to be greater than the setting temperature T1 of the heat generation region H1.

The setting temperature T1 of the heat generation region H1 is determined depending on a kind of the recording medium P, a pressure applied to the recording medium P passing through the nip portion NP, a passage time, and/or the like. In order to avoid or inhibit an excessive pressure from being applied, so as to reduce the size of the fixing device 50 or to increase travel stability of the endless belt 51, the setting temperature T1 of the heat generation region H1 may be set to be equal to or greater than the flow initiation temperature Tf of the toner, or may be set to be equal to or greater than the melting temperature Tm of the toner.

The setting temperature T2 of the heat generation region H2 is set to be greater than the setting temperature T1 of the heat generation region H1. The setting temperatures T2 of the heat generation region H2 are determined sequentially based on the degree of glossiness to be applied to the fixed image on the recording medium P, on a duration of time for the recording medium P to pass through the second heat generation region H2, on whether or not the second heat generation region H2 includes an auxiliary mechanism or the like, and the like.

The degree of the glossiness is determined depending on conditions at the time of peeling in addition to an adhesion property between the fixed image and the endless belt 51. Heat generated by the endless belt 51 in the heat generation region H1 and the heat generation region H2 is removed by radiation cooling or compulsory cooling between the third electrode portion E3 and the peeling member 55 (hereinafter, referred to as "cooling region CL"). Consequently, an adhesion property of the recording medium P with the endless belt 51 lessens, and when the recording medium P reaches a position adjacent the peeling member 55, the recording medium P is peeled off (e.g., by curvature separation) from the endless belt 51 due to rigidity of the recording medium P in a region where the curvature of the endless belt 51 varies.

When a temperature of the outer peripheral surface of the endless belt 51 having reached the peeling member 55 (hereinafter, referred to as "peeling temperature") exceeds the melting temperature Tm of the toner, the surface smoothness of the fixed image may be damaged when the endless belt 51 is peeled off from the fixed image, so as to interfere with the formation of the gloss on the fixed image. The peeling temperature is set to be equal to or less than the melting temperature Tm of the toner so as to apply gloss to the surface of the fixed image. In some example, the peeling temperature may be set to be equal to or less than the flow initiation temperature Tf of the toner, to peel off the endless belt 51 while maintaining a suitable surface smoothness of the fixed image, and thus improve the gloss application to the fixed image. In addition, the peeling temperature may be set to be equal to or less than the softening temperature Ts of the toner, to obtain a fixed image having very high gloss. However, in this case, the fixed image may substantially adhere to the endless belt 51, and a peeling auxiliary agent (or auxiliary peeling agent) may be used for peeling off the fixed image from the endless belt 51.

The peeling auxiliary agent is interposed in an interface between the outer peripheral surface of the endless belt 51 and the fixed image, for easier peeling of the fixed image from the endless belt 51. Accordingly, the peeling auxiliary agent may be directly applied to the outer peripheral surface of the endless belt 51, or may be added to the toner. In the case of directly applying the peeling auxiliary agent from the outside, an application mechanism or a supply device of the peeling auxiliary agent, and the like may be further provided.

In order to add the peeling auxiliary agent to the toner, an example method can be used. In an example method, the peeling auxiliary agent is made into fine particles beforehand, and the fine particles are dry-mixed (externally added) with toner base particles in combination with other inorganic fine particles, so that the peeling auxiliary agent is carried on the surface of the toner base particles. Accordingly, the peeling auxiliary agent is interposed in the interface between the endless belt 51 and the fixed image with greater efficiency, so as to easily peel off the recording medium P from the endless belt 51. In addition, a part of the peeling auxiliary agent interposed in the interface between the endless belt 51 and the fixed image remains, and contributes to protecting the outer peripheral surface of the endless belt 51.

The peeling auxiliary agent may be selected from materials which can be interposed in the interface between the endless belt 51 and the fixed image and which reduce an adhesive force between the endless belt 51 and the fixed image. According to examples, the peeling auxiliary agent may include fine particles of waxes, polyethylene wax, polypropylene wax, carnauba wax, or ester wax. The peeling auxiliary agent may include zinc distearate, zinc dipalmitate, zinc palmitate stearate, a mixture thereof, or the like. Examples of the peeling auxiliary agent include fine particles of a material in which a peak temperature of a maximum endothermic peak measured by a differential scanning calorimeter (DSC) is in a temperature region that is equal to or greater than a toner deformable temperature and that is equal to or less than a toner melting temperature.

In some examples, the peeling auxiliary agent includes a material that is a liquid phase in a temperature region that is equal to or greater than room temperature and that is equal to or less than the toner melting temperature. Accordingly, examples of the peeling auxiliary agent include silicone oils such as a dimethyl silicone oil, a methyl phenyl silicone oil, a methyl hydrogen silicone oil, an amino-modified silicone oil, an epoxy-modified silicone oil, a carboxy-modified silicone oil, a carbinol-modified silicone oil, a polyether-modified silicone oil, an alkyl-modified silicone oil, or a fluorine-modified silicone oil can be used. In the case of using any of the silicone oils as the peeling auxiliary agent, for example, inorganic fine particles which are coated or impregnated with the silicon oil are prepared in advance, and the inorganic fine particles are dry-mixed with toner base particles in combination with other inorganic fine particles, in order to obtain a toner containing the peeling auxiliary agent. According to examples, the amount of the inorganic fine particles contained is 1 part by mass to 15 parts by mass with respect to 100 parts by mass of toner base particles, and the amount of the silicone oil contained is 2% by mass to 20% by mass of the entirety of the inorganic fine particles, in order to reach a suitable peeling property of the recording medium P from the endless belt 51, and a suitable protection property of the outer peripheral surface of the endless belt 51 without deteriorating charging characteristics or powder characteristics of the toner.

Referring back to FIG. 2A, a positive electrode is connected to the first electrode portion E1 and the third electrode portion E3 of the image heating device 50A, and a negative electrode is connected to the second electrode portion E2. The polarities of voltages applied to the first electrode portion E1 and to the third electrode portion E3 may be set to the same voltage, in order to suppress heat generation from the third electrode portion E3 to the first electrode portion E1, and thereby achieve a cooling region CL.

Figure 7:
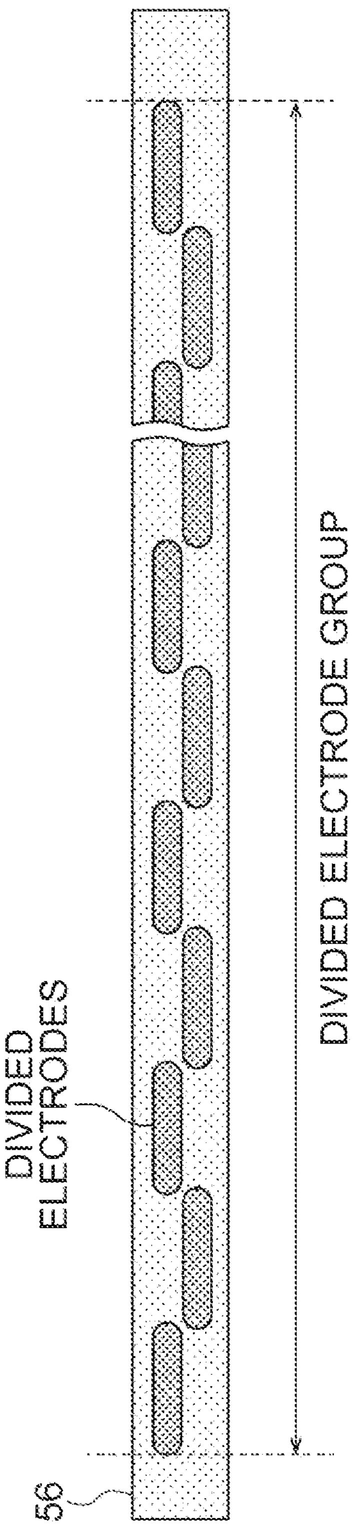
FIG. 7 is a schematic view illustrating an example electrode support member including a group of separate electrodes that form an electrode portion.

With reference to FIG. 7, in some examples, any one of the first electrode portion E1, the second electrode portion E2, and the third electrode portion E3 may be configured as a group of separate electrodes (e.g., divided electrode group) that are arranged in an axial direction (for example, a direction orthogonal to the view of FIG. 2A). Accordingly, it is possible to finely adjust the gloss of the fixed image within the same page or the same print lot by controlling a voltage applied to each of the separate electrodes (or divided electrodes).

In some examples, in order to reduce heat radiation from the heat generation layer 51*a* (cf. FIG. 3) of the endless belt 51 and thereby inhibit a deterioration of the base portion of the endless belt 51 due to heat shock, a thin metal plate of copper, zinc, aluminum, or the like, or a member printed with a carbon-based conductive paint is applied to the first electrode portion E1, the second electrode portion E2, and the third electrode portion E3. In addition, a height (or thickness, e.g., in the thickness direction of the endless belt 51) of each of the first electrode portion E1, the second electrode portion E2, and the third electrode portion E3 may be 1.5 or less times the thickness of the heat generation layer 51*a* of the endless belt 51. Accordingly, radiation of heat generated in the heat generation layer 51*a* of the endless belt 51 and a deterioration of a base portion of the endless belt due to heat shock may be minimized or reduced.

According to examples, the image heating device may include a cooling device as a cooling means, to reduce the time for heat removal from the endless belt 51, and thereby increase a degree of glossiness that may be applied to the fixed image, and increase productivity (e.g., printing efficiency).

For example, the image heating device 50A illustrated in FIG. 2A includes a cooling device 57 that is positioned to align with the cooling region CL. The cooling device 57 may be a small axial fan or the like, and may cool down a surface of the fixed image on the recording medium P through the endless belt 51 by cooling the inner peripheral surface of the endless belt 51, so as to form a suitable gloss on the surface of the fixed image.

With reference to FIG. 2B, the image heating device 50B includes a cooling device 57 that is positioned to align with the heat generation region H2. In addition to partial heat generation that may be achieved with separate electrodes as described above, a non-heat-generation portion may be partially cooled, so as to allow a wider range for the degree of gloss applied to the fixed image within the same page.

In some examples, the cooling device 57 may be provided adjacent both the second heat generation region H2 and the cooling region CL, in order to further increase productivity in addition to gloss application.

With reference to FIG. 1, the example imaging apparatus 1 includes a recording medium identification device 80 that is provided along the conveyance route 71 of the recording medium P. The example recording medium identification device 80 acquires identification information such as basis weight and surface smoothness of the recording medium P passing through the conveyance route 71, and outputs the identification information to a control unit (or controller) of the image heating device 50. The control unit of the image heating device 50 controls a fixing operation and a gloss application operation of the image heating device 50 based on the identification information obtained, to apply a targeted glossiness for each fixed image on the recording media. Accordingly, for a same printing lot in which different kinds of recording media are combined, recording medium information obtained by the recording medium identification device 80 may be transferred to the image heating device 50, to adjust the glossiness of an image to which gloss is applied or the degree of glossiness for each recording medium.

Examples of tests carried out will be described.

Test Example 1

To set a modified printer for a Test Example 1, a fixing device of a color multifunction printer (MFP) M577 do (manufactured by HP) that uses an electrophotographic method, was replaced with the example fixing device 50A having the glossiness adjustment function, illustrated in FIG. 2A, and a print speed of the modified printer was adjusted to 12 ppm.

To obtain the endless belt 51 for the fixing device 50A, a N-methyl-2-pyrrolidone (NMP) varnish of a polyimide precursor was applied on a cylindrical support in a spiral shape by a dispenser coating method, in which the precursor contains 10% by mass of multi-layer carbon nanotubes in terms of a solid content concentration, and in which the multi-layer carbon nanotubes are characterized by a diameter of 11 nm and a length of 10 μm. The spiral shaped precursor was heated and baked to obtain a tube-shaped polyimide composition having a thickness of 65 μm, which was coated with Perfluoroalkoxy (PFA) tubing with a coating thickness of 20 μm, to obtain the endless belt 51. With regard to volume resistivity of the endless belt 51 in a heat generation state, the volume resistivity in a rotation direction of the endless belt 51 (also referred to herein as rotation-direction volume resistivity) A was 0.17 Ω·cm, the volume resistivity in a lateral direction of the endless belt 51 (also referred to herein as axial-direction volume resistivity) B was 0.23 Ω·cm, and the volume resistivity ratio NB was 0.74.

In addition, a toner containing an auxiliary peeling agent was used for each of the colors. The toner for each of the colors was obtained by dry-mixing 1.0 part by mass of hydrophobized titania fine particles having a particle size of 30 nm, 0.5 part by mass of hydrophobized silica fine particles having a particle size of 20 nm, 0.5 part by mass of hydrophobized silica particles having a particle size of 100 nm, and 1.0 part by mass of silica fine particles as inorganic fine particles having a particle size of 30 nm, and treated with a silicone oil so as to contain 10 parts by mass of the silicone oil with respect to 100 parts by mass of silica fine particles, to 100 parts by mass of toner base particles of one color, in which the toner base particles have a particle size of 5.6 μm and are produced by an emulsion aggregation method. A total amount of the inorganic fine particles added with respect to the toner base particles of each color was 3.0 parts by mass, and the silicone oil treatment amount in the total inorganic fine particles was 3.3% by mass.

A toner flow curve of each color of toner was measured by the temperature rise method. From the measurement, for each color of toner, the softening temperature Ts was 68° C., the flow initiation temperature Tf was 77° C., and the melting temperature Tm was 101° C.

Figure 5:
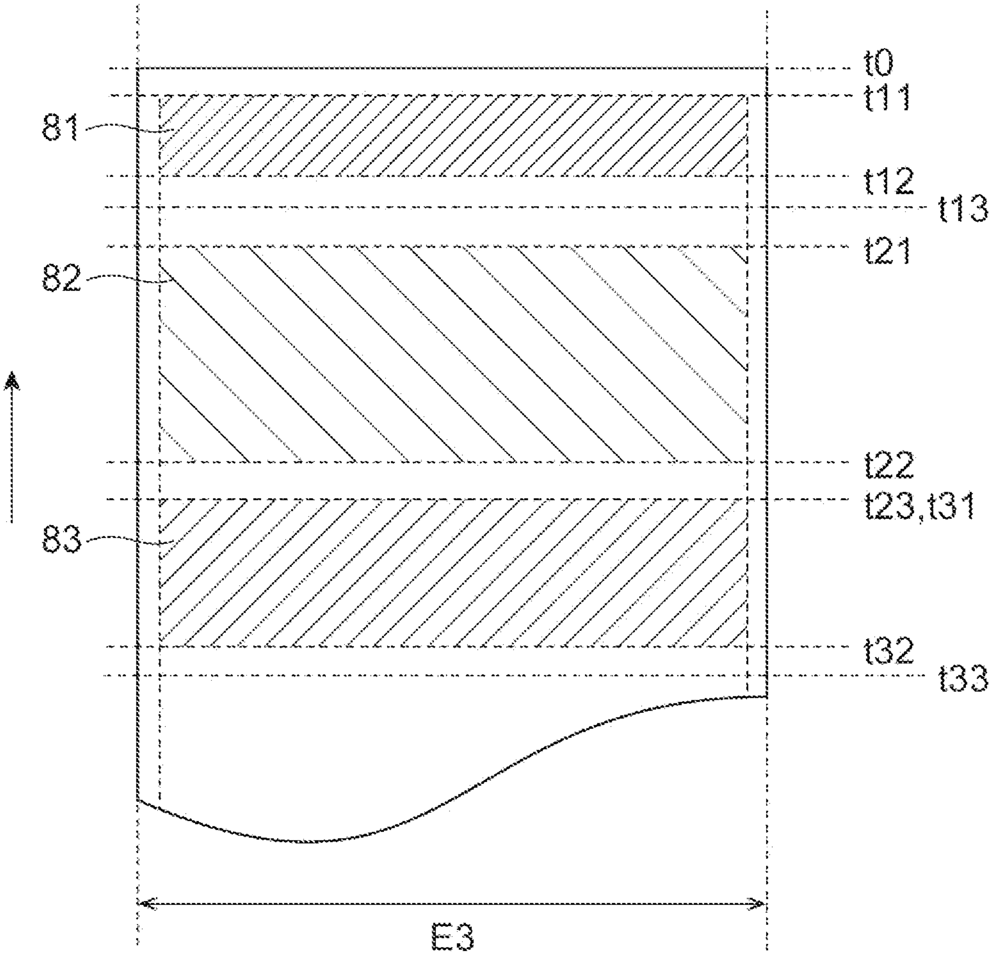
FIG. 5 is a schematic diagram of a print page, illustrating a test print pattern.

FIG. 5 illustrates a test print pattern used in a printout test. The test print pattern includes band-shaped images 81 to 83 having different lengths in a vertical direction in the same page. The vertical direction indicated by an arrow represents an imaging (e.g., image formation) direction. Times t0 to t33 are described below.

- t0 represents a time at which a sheet tip end portion has passed beyond a downstream end of the second electrode portion E2 (inserted into the heat generation region H2)
- t11 represents a time at which a tip end of the image 81 has passed beyond a downstream end of the second electrode portion E2
- t12 represents a time at which a rear end of the image 81 has passed beyond the downstream end of the second electrode portion E2
- t13 represents a time at which the rear end of the image 81 has reached an upstream end of the third electrode portion E3 (has passed beyond the heat generation region H2)
- t21 represents a time at which a tip end of the image 82 has passed beyond the downstream end of the second electrode portion E2
- t22 represents a time at which a rear end of the image 82 has passed beyond the downstream end of the second electrode portion E2
- t23 represents a time at which the rear end of the image 82 has reached the upstream end of the third electrode portion E3
- t31 represents a time at which a tip end of the image 83 has passed beyond the downstream end of the second electrode portion E2
- t32 represents a time at which a rear end of the image 83 has reached the downstream end of the second electrode portion E2
- t33 represents a time at which the rear end of the image 83 has reached the upstream end of the third electrode portion E3

A zone between time t12 and time t13 represents a time zone at which the rear end of the image 81 passed through the heat generation region H2. This time corresponds to a value obtained by dividing a distance from the downstream end of the second electrode portion E2 constituting the heat generation region H2 to the upstream end of the third electrode portion E3 (also referred to as "inter-electrode distance") by a process speed of the image heating device. Similarly, a time zone between time t22 and time t23 and a time zone between time t32 and time t33 represent times zones during which the rear ends of the image 82 and the image 83, respectively, passed through the heat generation region H2.

An interval between the image 81 and the image 82 is equal to or greater than an inter-electrode distance, and accordingly the time t21 occurs after the time t13. In addition, a distance interval between the image 82 and the image 83 equals the inter-electrode distance, and accordingly, the time t23 corresponds to the same time as the time t31. In this regard, the distance interval between images is shorter than the inter-electrode distance, and an image located downstream in the imaging direction is influenced by processing conditions of an image located on an upstream side, and it is possible to selectively set associated conditions.

First, a fixing operation was performed on a thick recording medium having a basis weight of 128 g/m$^2$), in a non-operational state of the heat generation region H2 (also referred to herein as an H2 non-operational state) in which an AC voltage of 20 V is applied between the first electrode portion E1 and the second electrode portion E2, and no voltage is applied between the second electrode portion E2 and the third electrode portion E3.

As a result, a temperature of the heat generation region H1 reached 150° C., and a fixing rate in any of the images 81 to 83 obtained was 90% or greater. In addition, with regard to the glossiness of the images obtained, the glossiness of the image 81 was 14, the glossiness of the image 82 was 12, and the glossiness of the image 83 was 11. Since the thick recording medium was used, and thus a difference of 3 occurred in the glossiness between the upstream side image 81 and the downstream side image 83, which is considered an acceptable difference in practical use.

Next, the fixing operation and the gloss application operation were performed in an operational state of the heat generation region H2 (also referred to herein as an H2 operational state) in which a voltage is applied between the second electrode portion E2 and the third electrode portion E3 while also maintaining the application voltage between the first electrode portion E1 and the second electrode portion E2. At this time, the voltage was applied between the second electrode portion E2 and the third electrode portion E3 to operate the heat generation region H2 so that a temperature of the heat generation region H2 reaches 165° C. between the time t11 and the time t13, and reaches 180° C. between the time t21 and the time t23, and further reaches 160° C. between the time t31 and the time t33. At this time, a surface of the endless belt 51 that reached the peeling member 55 was cooled down to a range of 80° C. to 95° C. by radiation.

As a result, with regard to the glossiness of images obtained, the glossiness of the image 81 was 16 (increased by 2 in comparison to the H2 non-operational state), the glossiness of the image 82 was 18 (increased by 6 in comparison to the H2 non-operational state), and the glossiness of the image 83 was 14 (increased by 3 in comparison to the H2 non-operational state). In this manner, images showing different glossiness in the same page could be fixed without decreasing productivity. In addition, the fixing rate was improved, and image peeling due to bending of the recording medium was less likely to occur.

In addition, the glossiness of the image 83 was substantially the same as the glossiness of the image 81 obtained in the H2 non-operational state. Even in the case of using a thick recording medium, when the heat generation region H2 was caused to operate in specific conditions, the glossiness of images in the same page could be made uniform.

After termination of the printout test, the endless belt 51 examined. From the examination, a part of the silicon oil contained in the toner remained on the outer peripheral surface of the endless belt 51, and the outer peripheral surface of the endless belt 51 was maintained in a satisfactory state, in that a suitable amount of silicon oil was present on the outer peripheral surface.

Test Example 2

Figure 6:
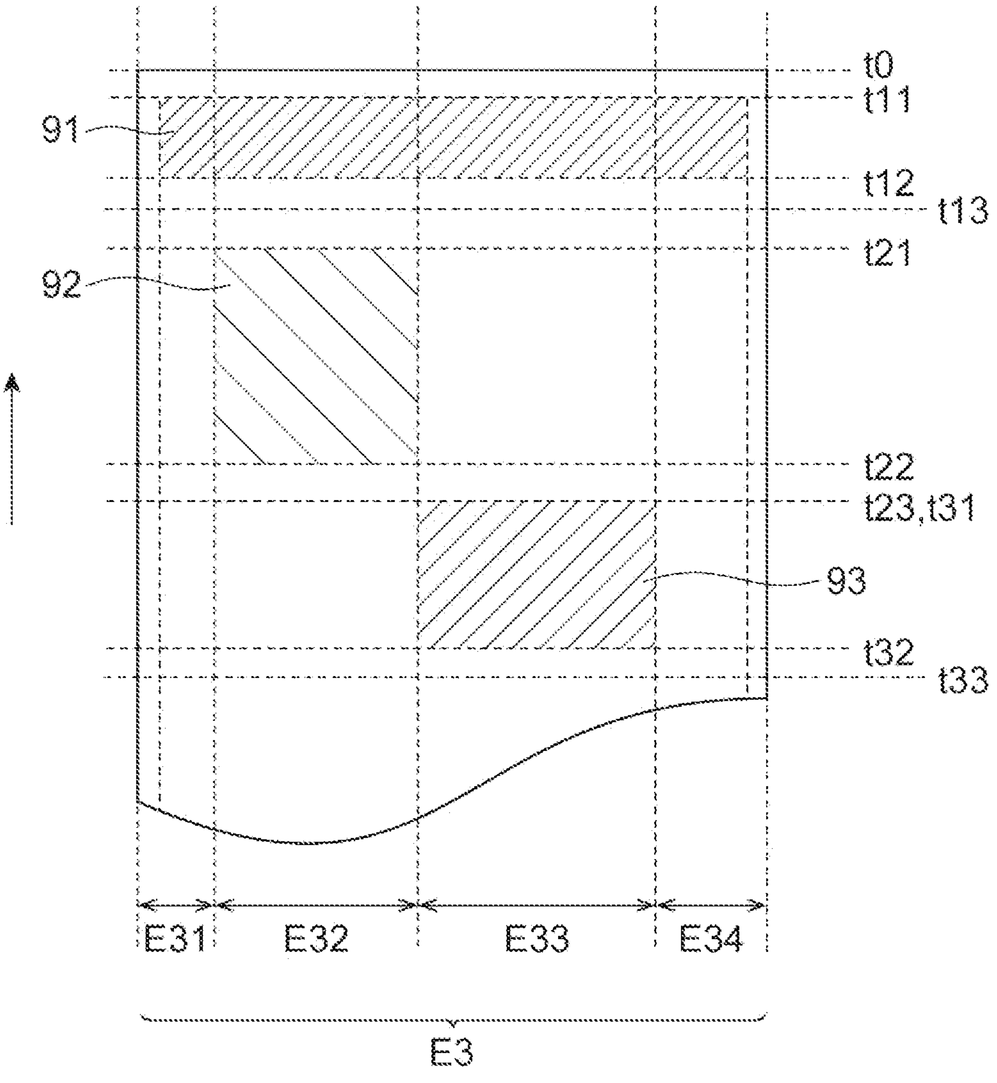
FIG. 6 is a schematic diagram of a print page, illustrating a test print pattern.

In a Test Example 2, a printout test was performed in a similar manner as in Test Example 1 except that a group of separate electrodes that are finely divided in the width direction of the belt (the axial direction) was used as the third electrode portion E3 of the fixing device 50A of Test Example 1. FIG. 6 illustrates a test print pattern used in the printout test. The test print pattern includes band-shaped images 91 to 93 having different image widths and lengths in an imaging direction (e.g., the vertical direction indicated by an arrow) within the same page.

Different glossiness may be applied to the images 91 to 93. For example, in the gloss application operation with respect to the image 91, the entirety of the third electrode portion E3 is used. Additionally, in the gloss application operation with respect to the image 92, a group of separate electrodes located in a range identified by E32 (also referred to as "divided electrode group E32" or "electrode group E32") corresponding to an image width of the image 92 is used. Similarly, with respect to the image 93, a group of separate electrodes located in a range indicated by E33 (also referred to as "divided electrode group E33" or "electrode group E33") corresponding to an image width of the image 93 is used. The arrow in the drawing represents the imaging direction. Times t0 to t33, similar to those in Test Example 1, represent the times as described below.

t0 represents a time at which a sheet tip end has passed beyond the downstream end of the second electrode portion E2 (inserted into the heat generation region H2)

t11 represents a time at which a tip end of the image 91 has passed beyond the downstream end of the second electrode portion E2 t12 represents a time at which a rear end of the image 91 has passed beyond the downstream end of the second electrode portion E2 t13 represents a time at which the rear end of the image 91 has reached the upstream end of the third electrode portion E3 (has passed beyond the heat generation region H2)

t21 represents a time at which a tip end of the image 92 has passed beyond the downstream end of the second electrode portion E2 t22 represents a time at which a rear end of the image 92 has passed beyond the downstream end of the second electrode portion E2 t23 represents a time at which the rear end of the image 92 has reached an upstream end of the electrode group E32 t31 represents a time at which a tip end of the image 93 has passed beyond the downstream end of the second electrode portion E2 t32 represents a time at which a rear end of the image 93 has reached the downstream end of the third electrode portion E3 t33 represents a time at which the rear end of the image 93 has reached the upstream end of the electrode group E33

As in Test Example 1, a voltage was applied between the second electrode portion E2 and the third electrode portion E3 (the entirety of separate or divided electrodes) between the time t11 and the time t13 while maintaining an application voltage between the first electrode portion E1 and the second electrode portion E2 so that the temperature of the heat generation region H1 reached 150° C. In addition, the heat generation region H2 was set to reach 165° C., and between the time t21 and the time t23, a voltage was applied between the second electrode portion E2 and the electrode group E32 so that the heat generation region H2 reached 180° C. Between the time t31 and the time t33, a voltage was applied between the second electrode portion E2 and the electrode group E33, the heat generation region H2 was set to reach 160° C., and the fixing operation and the gloss application operation were performed in the H2 operational state. At this time, a surface of the endless belt 51 that reached the peeling member 55 was cooled by radiation to a range of 80° C. to 95° C.

As a result, the glossiness of the image 91 was of 16, the glossiness of the image 92 was of 18, and the glossiness of the image 93 was of 14. In addition, with respect to images which are scattered in the same page and have dimensions and shapes different from each other, glossiness could be applied selectively without decreasing productivity. In addition, the heat generation region H2 in this case corresponds to the length of the respective separate electrodes, in order to reduce power consumption for fixing, and to reduce an application voltage for reaching a target temperature.

Test Example 3

As a cooling device, the peeling member 55 was replaced with a hollow sleeve made of aluminum so that residual heat of the endless belt 51 could be radiated. The rotation-direction volume resistivity A of the endless belt 51 is less than the axial-direction volume resistivity B, so as to increase conductivity and thermal diffusibility in the rotation direction, and promote heat removal by the peeling member 55. In addition, the inside of the hollow sleeve can be ventilated, to increase cooling efficiency. In the test, a small blower was provided as the cooling device 57, and the blower was set to operate between the time t21 and the time t23, and between the time t31 and the time t33 to cool down the endless belt 51.

First, in a state in which the small blower was not operated (referred to herein as "small blower stoppage state"), a fixing process was performed in a similar manner as in Test Example 2. At this time, a surface of the endless belt 51 that reached the peeling member 55 was cooled down to a range of 72° C. to 75° C. due to a radiation cooling effect by the hollow sleeve made of aluminum.

As a result, with regard to the glossiness of images obtained, the glossiness of the image 91 was of 25 (increased by 9 in comparison to Test Example 2), the glossiness of the image 92 was of 38 (increased by 20 in comparison to Test Example 2), and the glossiness of the image 93 was of 19 (increased by 5 in comparison to Test Example 2).

Accordingly, when the peeling member 55 was replaced with the hollow sleeve made of aluminum, and the residual heat of the endless belt 51 was radiated, the surface smoothness of the endless belt 51 was transferred to an image surface, and the glossiness of the image surface was increased selectively.

In addition, the same fixing process was performed in a similar manner as described above with the exception that the small blower was operated between the time t21 and the time t23, and the time t31 and the time t33. At this time, the surface of the endless belt 51 that reached the peeling member 55 was cooled down to 65° C. or less due to a cooling effect by the small blower in addition to the radiation cooling effect by the hollow sleeve made of aluminum.

As a result, with regard to the glossiness of images obtained, the glossiness of the image 91 was maintained at 25, the glossiness of the image 92 was of 55 (increased by 17 in comparison to the small blower stoppage state), and the glossiness of the image 93 was of 21 (increased by 2 in comparison to the small blower stoppage state).

Accordingly, when the endless belt 51 was cooled down by using the small blower, the surface smoothness of the endless belt 51 was transferred and the glossiness of the image surface was increased.

Test Example 4

In a test Example 4, the fixing device 50A used in Test Example 1 was replaced with the fixing device 50B with a glossiness adjustment function illustrated in FIG. 2B. The print speed was set to 12 ppm. In the context of carrying out small lot printing such as for a catalog booklet, a test was performed to print out an output image in which the kind and the basis weight of the recording medium are mixed, and a text image (set at low gloss), an illustration image (set at intermediate gloss), and a photographic image (set at high gloss) are combined in the same page.

One unit of print work was set to 10 sheets of recording media, which corresponded to 20 pages for double-sided printing. The content information for each page is listed in Table 1. This was repeated as printout of 10 units, namely for 10 sets of 10 sheets.

TABLE 1

| Page | Kind of recording medium, others | Contents of output image | Remark |
|---|---|---|---|
| 1 | Surface of thick paper (basis weight; 128 g/m$^2$) | Illustration image, text image | Catalog front cover |
| 2 | Back surface of thick paper (basis weight; 128 g/m$^2$) | (Without image) | |
| 3 | Surface of plain paper (basis weight; 65 g/m$^2$) | Text image | |
| 4 | Back surface of plain paper (basis weight; 65 g/m$^2$) | Text image, photographic image | Page combining text image with photographic image |
| 5-18 | Plain paper (basis weight; 65 g/m$^2$), seven sheets | (Repeated double-sided printing of same contents as in third item and fourth item) | |
| 19 | Surface of thick paper (basis weight; 128 g/m$^2$) | (Without image) | |
| 20 | Back surface of thick paper (basis weight; 128 g/m$^2$) | Text image | Catalog back cover |

At this time, an application voltage between the first electrode portion E1 and the second electrode portion E2 was controlled based on the basis weight and the surface smoothness (identification information) of each recording medium which were obtained by the recording medium identification device 80 so that the temperature of the heat generation region H1 reaches 150° C. In addition, to improve the glossiness of the illustration image or the photographic image, a voltage application position and a voltage application time to the second electrode portion E2 and the third electrode portion E3 including the group of separate electrodes were controlled based on the position information of each of the images, thereby adjusting the glossiness of a corresponding image portion.

Consequently, it was possible to perform small lot printing in which an intermediate-gloss illustration image having a glossiness of 20 and a high-gloss photographic image having a glossiness of 53 were disposed in combination with a low-gloss text image having a glossiness of 12 were formed within the same page without decreasing productivity.

After the printout test was terminated, the endless belt 51 was examined. From the examination, a part of the silicone oil contained in the toner remained on the outer peripheral surface of the endless belt 51, and the outer peripheral surface of the endless belt 51 maintained in a suitable surface state.

Test Example 6

Figure 8:
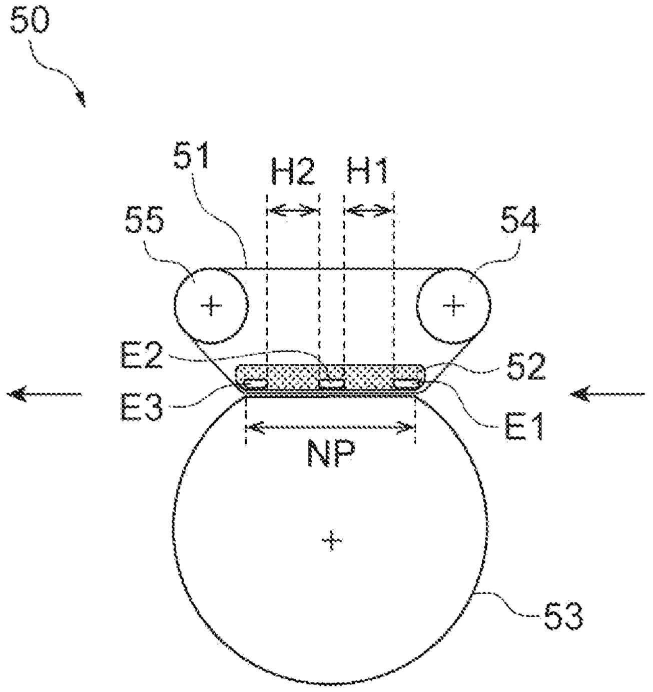
FIG. 8 is a schematic diagram of an example image heating device including a plurality of heat generation regions in a nip portion.

The fixing device 50A used in Test Example 1 was replaced with a fixing device 50C as illustrated in FIG. 8, and a toner without peeling auxiliary agent was used. The toner without peeling auxiliary agent was obtained by replacing the silica fine particles treated with silicone oil which were added to the toner used in Test Example 1, with 1.0 part by mass of hydrophobized silica fine particles having a particle size of 30 nm. A distance between the first electrode portion E1 and the second electrode portion E2, and a distance between the second electrode portion E2 and the third electrode portion E3 were set to 5 mm, and each of the electrode portions were positioned in a region of the nip portion NP. The printout test was performed in a similar manner as in Test Example 1, but since the first heat generation region and the second heat generation region were located in the region of the nip portion NP, it was more difficult to form images showing different glossiness within the same page. In addition, fine scratches were formed on the outer peripheral surface of the endless belt 51.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. An image heating device comprising:

a conveyance belt to convey a recording medium that includes an image, wherein the conveyance belt includes a heat generation layer to generate heat by energization;

a pressing member located adjacent the conveyance belt;

a rotary driving member extending along a rotation axis to drive the conveyance belt in a movement direction about the rotation axis, wherein the rotary driving member is located adjacent the pressing member to position the conveyance belt between the pressing member and the rotary driving member so as to form a contact width extending in the movement direction, where the conveyance belt contacts both the pressing member and the rotary driving member; and three electrode portions including a first electrode portion, a second electrode portion, and a third electrode portion that are in contact with the heat generation layer of the conveyance belt, and spaced apart in the movement direction to form a first heat generation region between the first electrode portion and the second electrode portion, and to form a second heat generation region between the second electrode portion and the third electrode portion, wherein the second heat generation region is located outside the contact width.

2. The image heating device according to claim 1, wherein the first heat generation region and the second heat generation region are located in a region of the conveyance belt to contact the recording medium.

3. The image heating device according to claim 2, wherein the first heat generation region is located at least in part within the contact width, the first heat generation region to generate heat to a first temperature that is equal to or greater than a deformation temperature at which a material forming the image is deformable.

4. The image heating device according to claim 3, wherein the second heat generation region generates heat to a second temperature that is different from the first temperature associated with the first heat generation region.

5. The image heating device according to claim 4, wherein the second temperature associated with the second heat generation region is set to be greater than the first temperature associated with the first heat generation region.

6. The image heating device according to claim 1, comprising:

a peeling member that is in contact with the heat generation layer, wherein a peeling region of the conveyance belt is formed adjacent the peeling member to peel-off the image from the conveyance belt, wherein the peeling member is spaced apart from the third electrode portion on a downstream side of the third electrode portion in the movement direction of the conveyance belt to form a cooling region between the third electrode portion and the peeling member, to set a surface temperature of the peeling region of the conveyance belt to be equal to or less than a flow initiation temperature that corresponds to a temperature at which the material that constitutes the image becomes fluid.

7. The image heating device according to claim 6, wherein the peeling member includes a cooling device.

8. The image heating device according to claim 1, wherein the conveyance belt extends in an axial direction that is parallel to the rotation axis of the rotary driving member, and wherein the third electrode portion is divided in the axial direction of the conveyance belt into separate electrodes.

9. The image heating device according to claim 1, wherein the conveyance belt is an endless belt that extends in a rotational direction that defines the movement direction, and that additionally extends in an axial direction that is parallel to the rotation axis of the rotary driving member, wherein the endless belt includes a base portion formed of a nanocomposite material in which carbon fillers are dispersed, and wherein a rotation-direction volume resistivity of the base portion in the rotational direction is less than an axial-direction volume resistivity of the base portion in the axial direction.

10. The image heating device according to claim 1, comprising:

a cooling device located adjacent the second heat generation region.

11. An imaging apparatus comprising:

a transfer device to form a toner image on a recording medium; and an image heating device to heat the toner image formed on the recording medium, wherein the image heating device includes:

an endless belt having an outer peripheral surface to contact the toner image on the recording medium;

a driving roller to drive the endless belt to rotate in a rotational direction;

a pressing member to press the endless belt against the driving roller in a contact width of the endless belt; and three electrode portions including a first electrode portion, a second electrode portion, and a third electrode portion that are in contact with the endless belt, and spaced apart in a movement direction to form a first heat generation region between the first electrode portion and the second electrode portion, and to form a second heat generation region between the second electrode portion and the third electrode portion, wherein the second heat generation region is located outside the contact width; and wherein the endless belt includes a fixing region located along the contact width to generate heat to fix the toner image onto the recording medium during a fixing operation, a glossing region located downstream the fixing region to form a gloss on the image having been fixed during a gloss application operation, and a peeling region located downstream the glossing region to peel off the recording medium from the endless belt.

12. The imaging apparatus according to claim 11, comprising:

a controller to control the fixing operation and the gloss application operation of the image heating device in accordance with image information associated with an output image to be formed.

13. The imaging apparatus according to claim 12, comprising:

a recording medium identification device to generate identification information on the recording medium, the control unit to control the fixing operation and the gloss application operation of the image heating device in accordance with the identification information generated by the recording medium identification device.

14. An imaging apparatus comprising:

a toner container to accommodate a toner that includes toner base particles and inorganic fine particles containing a peeling auxiliary agent;

a transfer device to transfer the toner to form a toner image on a recording medium; and an image heating device to heat the toner image formed on the recording medium, wherein the image heating device includes:

an endless belt having an outer peripheral surface to contact the toner image on the recording medium, the endless belt comprising a contact width between a pressing member and a driving roller of the image heating device;

three electrode portions including a first electrode portion, a second electrode portion, and a third electrode portion that are in contact with the endless belt, and spaced apart in a movement direction to form a first heat generation region between the first electrode portion and the second electrode portion, and to form a second heat generation region between the second electrode portion and the third electrode portion; and a peeling roller around which the endless belt is wound to form a curvature variation in the endless belt, so as to cause the recording medium to peel-off from the endless belt during a heat removal operation, wherein a portion of the peeling auxiliary agent included in the toner of the toner image is caused to remain on the outer peripheral surface of the endless belt; and wherein the second heat generation region is located outside the contact width.

15. The imaging apparatus according to claim 14, wherein the toner container accommodates the toner, and wherein the peeling auxiliary agent has a liquid phase at least in a temperature range that has a minimum corresponding to a room temperature and a maximum corresponding to a melting temperature of the toner.

* * * * *